United States Patent

Okanoue et al.

[11] Patent Number: 6,122,268
[45] Date of Patent: Sep. 19, 2000

[54] METHOD FOR ALLOCATING GEOGRAPHICAL IDENTIFIER AND NETWORK CORRESPONDING TO MOVABLE HOSTS

[75] Inventors: Kazuhiro Okanoue; Tomoki Osawa, both of Tokyo, Japan

[73] Assignee: NEC Corporation, Tokyo, Japan

[21] Appl. No.: 08/878,341

[22] Filed: Jun. 18, 1997

[30] Foreign Application Priority Data

Jun. 18, 1996 [JP] Japan ..................................... 8-177391

[51] Int. Cl.⁷ ................................ H04Q 7/24; H04Q 7/20
[52] U.S. Cl. ........................... 370/338; 455/435; 455/349
[58] Field of Search .................................... 370/328, 329, 370/331, 338, 341, 349, 401; 455/435

[56] References Cited

U.S. PATENT DOCUMENTS

| | | | |
|---|---|---|---|
| 5,442,633 | 8/1995 | Perkins et al. .......................... | 370/331 |
| 5,519,706 | 5/1996 | Bantz et al. ............................. | 370/329 |
| 5,604,765 | 2/1997 | Bruno et al. ............................. | 375/200 |
| 5,684,800 | 11/1997 | Dobbins et al. ......................... | 370/401 |
| 5,684,859 | 11/1997 | Chanroo et al. ........................ | 455/33.1 |

*Primary Examiner*—Chau Nguyen
*Assistant Examiner*—Chiho Andrew Lee
*Attorney, Agent, or Firm*—Scully, Scott, Murphy & Presser

[57] ABSTRACT

A method for allocating a geographical identifier is executed in a network for supporting a plurality of movable hosts being moved among a plurality of sub networks as keeping communications therebetween. When movable hosts 100, 101 moves to a sub network 110, an agent 120 of the sub network 110 allocates the same geographical identifier depending on the sub network 110 to the movable hosts 100 and 101 and stores logical identifiers and link layer addresses of the movable hosts 100 and 101. The packets destined for the movable hosts 100 and 101 are sent to the agent 120. The agent gets to know the link layer address corresponding to the logical identifier of a destination movable host described in a network layer header of the received packet from the registration table, generates the link layer header of the destination movable host, and add the link layer header to the received packet before transferring the received packet.

2 Claims, 9 Drawing Sheets

| LINK LAYER ADDRESS | LOGICAL IDENTIFER | GEOGRAPHICAL IDENTIFIER |
|---|---|---|
| LINK LAYER ADDRESS OF MOVABLE HOST 100 | H1 | A1 |
| LINK LAYER ADDRESS OF MOVABLE HOST 101 | H2 | A1 |

PRIOR ART

FIG. 9
PRIOR ART

METHOD FOR ALLOCATING GEOGRAPHICAL IDENTIFIER AND NETWORK CORRESPONDING TO MOVABLE HOSTS

BACKGROUND OF THE INVENTION

The present invention relates to a method for efficiently utilizing a geographical identifier in a network for activating a plurality of movable hosts and a network that corresponds to the plurality of movablehosts As a network for supporting a plurality of movable hosts, there has been known a network configured for defining the following two identifiers and managing the correspondence for each identifier for supporting the movable host. Two identifiers are a logical identifier and a geographical identifier. The logical identifier that identifies a mobile host itself, being independent of a point of the mobile host connecting with a subnetwork. The geographical identifier that indicates a location of a mobile host, being dependent of a point of the mobile host connecting with a subnetwork. (See Okanoue, Osawa, Gotoh, and Komatsu, "IP Mobility with Double IP Header", Proceedings of Institute of Electronics Information and Communication Engineers, IN95-64, Vol.95, No.269, September 1995) (referred to as a writing 1). This network is configured to separate a network layer into sublayers based on a logical identifier and a geographical identifier and encapsulate a packet with a logical identifier based header added thereto by using a geographical identifier based header for realizing communications with a movable host.

This network includes one or more nodes for supporting the movable host provided with the logical identifier and the geographical identifier. The node is called agent. The agent is categorized into two, an home agent (referred to as HA, hereinafter) and a foreign agent (referred to as FA, hereinafter). The sub network configured on the logical identifier of each movable host is defined as a home network (referred to as HN, hereinafter).

The HA is located on the HN of each movable host. Each time the movable host is moved to another sub network, the logical identifier and the geographical identifier are registered in the HA. Hence, the HA provides a capability of managing the location information of the movable host whose agent is constantly the HA.

On the other hand, the FA is located at each sub network for supporting the movable host and provides a capability of supporting communications with all movable hosts located in the sub network. When the movable host is moved to another sub network, the movable host serves to set the agent of the sub network to the FA and register the logical identifier and the geographical identifier to the FA. A host that is communicating with the movable host is capable of managing a pair of a logical identifier and a geographical identifier of the subject movable host.

Figure 8:
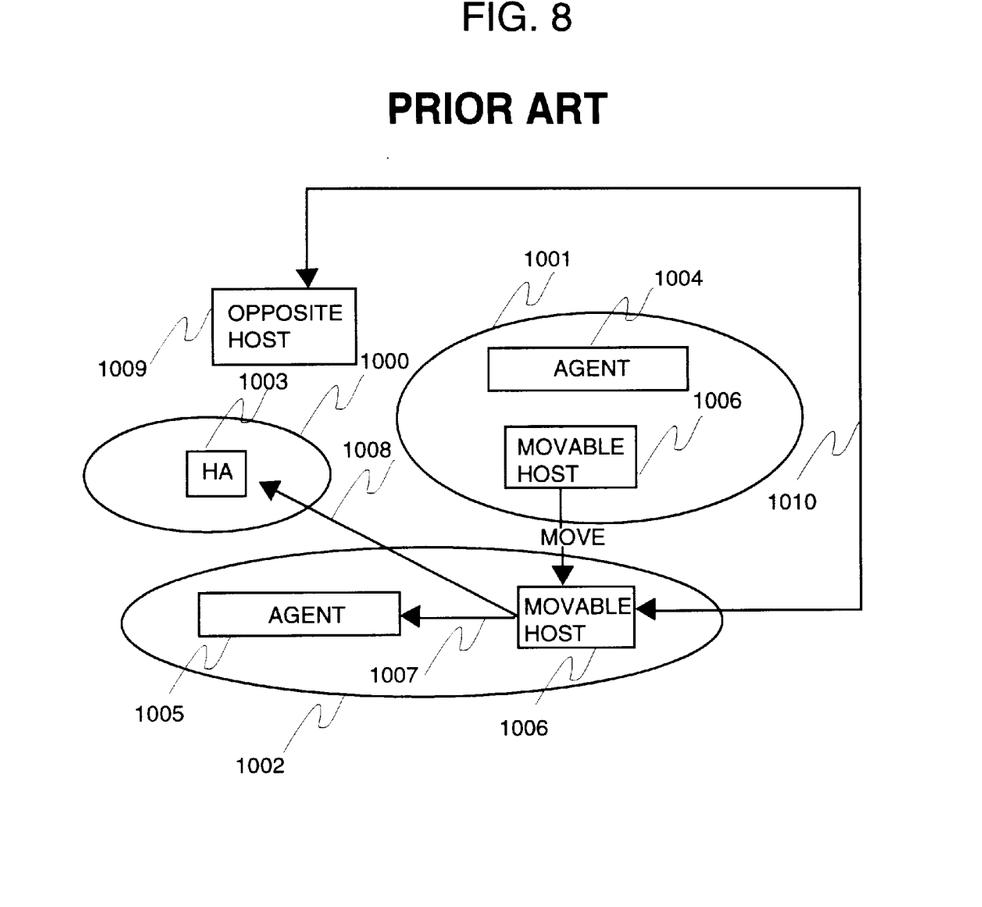
FIG. 8 is a diagram showing a movable control of a network for supporting a movable host.

FIG. 8 illustrates how the movable host manages the logical identifier and the geographical identifier. In FIG. 8, numerals 1000 to 1002 denote sub networks. Numerals 1003 to 1005 denote agents. A numeral 1006 denotes a movable host. A numeral 1009 denotes an opposite host with which the movable host 1006 is communicating. The sub network 1000 is the HN of the movable host 1006. The agent 1003 is the HA of the movable host 1006. The movable host 1006 uses home-1 that depends on the HN of the sub network 1000 as the logical identifier. In this configuration, the description will be oriented to the movement of the movable host 1006 from the sub networks 1001 to 1002 as keeping communication with the opposite host.

When the movable host 1006 moves to the sub network 1002, the identifier, location-1, depending on the sub network 1002 is used as the geographical identifier of the movable host 1006. At this time, the agent 1005 located in the new sub network 1002 is set to the FA of the movable host 1006. The pair of the logical identifier and the geographical identifier (home-1 and location-1) of the movable host 1006 is notified to the agent 1003 that is the HA of the movable host 1006 and the agent 1005 that is the FA of the movable host 1006. The pair of the logical identifier and the geographical identifier (home-1 and location-1) of the movable host 1006 is notified to the opposite host 1006 with which the movable host is communicating through the communication executed between both of the hosts.

Figure 9:
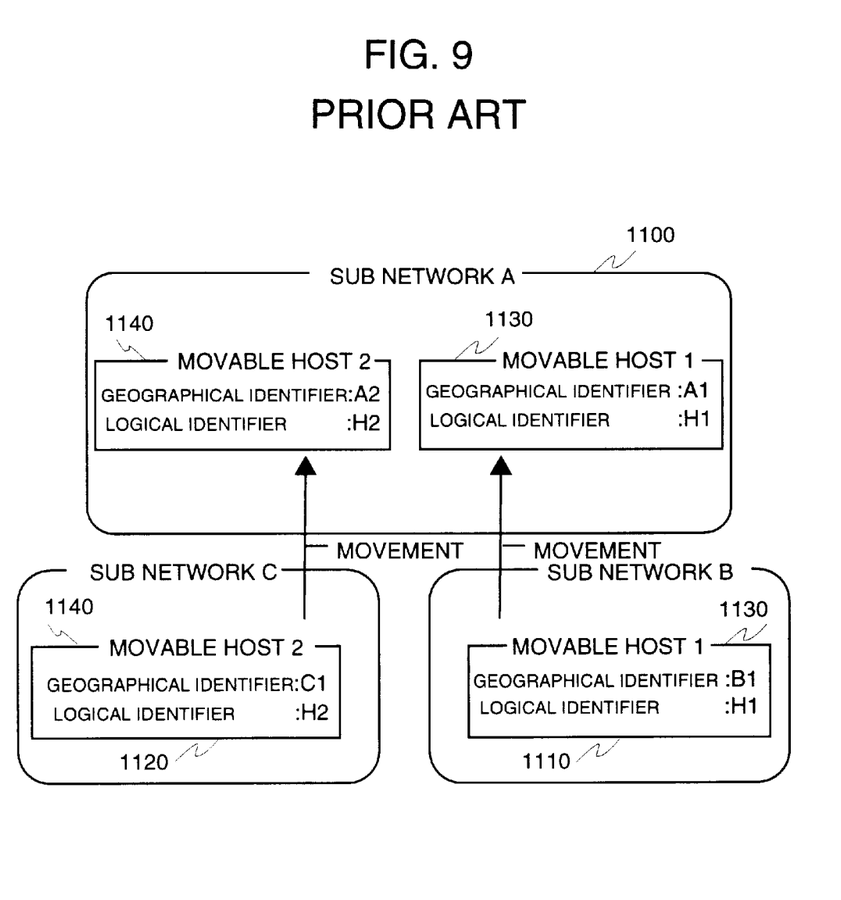
FIG. 9 is a prior art of a model view showing a network model for describing the conventional method for allocating a geographical identifier.

In the conventional system, a plurality of movable hosts located in one sub network utilize their own geographical identifiers that are different from each other. This environment is shown in FIG. 9. In FIG. 9, numerals 1100, 1110, and 1120 denote sub networks. Numerals 1130 and 1140 denote movable hosts. The movable host 1130 is located in the sub network 1110. The movable host 1140 is located in the sub network 1120. The movable host 1130 uses (H1, B2) as the pair of a logical identifier and a geographical identifier. The movable host 1140 uses (H2, C3) as the pair of a logical identifier and a geographical identifier. When the movable hosts 1130 and 1140 move to the sub network 1100, the movable host 1130 uses (H1, A1) as the pair of a logical identifier and a geographical identifier. The movable host 1140 uses (H2, A2) as the pair of a logical identifier and a geographical identifier.

Where a plurality of movable hosts are concurrently located in one sub network, it is necessary to provide the same number of geographical identifiers as the number of movable hosts concurrently existing in the sub network. Therefore, the conventional system has a drawback of bringing about a shortage of geographical identifiers and thereby disabling to support one or more movable hosts newly relocated from another sub network.

SUMMARY OF THE INVENTION

The present invention is made in consideration of overcoming the drawback and it is an object of the present invention to provide a method for allocating a geographical identifier which is arranged to allocate the same geographical identifier to plural movable hosts located in a sub network.

It is another object of the present invention to provide a method for allocating a geographical identifier and a network for movable hosts which are arranged to overcome a shortage of geographical identifiers and guarantee the communications among lots of movable hosts.

The present invention is a method for allocating a geographical identifier, implemented in a network including: a plurality of sub networks connected with one another; and a plurality of movable hosts each having a geographical identifier depending on the currently connected sub network and a logical identifier independent of said currently connected sub network and allowing to be moved among said sub networks as keeping communication therebetween, each of said movable hosts serving to do communications of packets each having a header based on said geographical identifier and another header based on said logical identifier; said method comprising the step of allocating a same geographical identifier to the plurality of movable hosts connected to a given sub network contained in said network.

Also, The present invention is a network for movable hosts comprising: a plurality of sub networks connected with one another; a plurality of movable hosts each having a geographical identifier depending on the currently connected sub network and a logical identifier independent of the currently connected sub network and allowing to be moved among said plurality of sub networks as keeping communication therebetween; a node provided at every sub network, for allocating a same geographical identifier to a plurality of movable hosts connected to said sub network and supporting communications with said movable hosts connected to said sub network.

Also, The present invention is a node included in a network for movable hosts, said network including: a plurality of sub networks connected with one another; a plurality of movable hosts each having a geographical identifier depending on the currently connected sub network and a logical identifier independent of the currently connected sub network and allowing to be moved among said sub networks as keeping communication therebetween, each of said movable hosts serving to do communications of packets each having a header based on said geographical identifier and another header based on said logical identifier, the movable hosts connected to one sub network of said plurality of movable hosts having a same geographical identifier, comprising: a registration table for storing a logical identifier and a link layer address of each of said movable hosts to which the same geographical identifier is allocated in linkage with each other; means for detecting a destination logical identifier of said received packet; means for detecting if said received packet is destined for said movable hosts to which said same geographical identifier is allocated, based on said detected destination logical identifier; means for retrieving a link layer address of a movable host specified by said destination logical identifier from said registration table if said received packet is destined for said movable hosts to which said same geographical identifier is allocated; means for generating a link layer header based on said detected link layer address and adding said link layer header to said received packet; and means for transferring said packet with said link layer header added thereto.

The geographical identifier added to the movable host with movement from one sub network to another one is treated as an address in a network layer. The movable host, however, has an independent link layer address of an address of the network address. The method of this invention is arranged to allocate the geographical identifier of the same network layer to a plurality of movable hosts located in the same sub network and identify each movable host with their own logical identifier and link layer address. This method enables to overcome the shortage of geographical identifiers in the movable hosts located in one sub network.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

The embodiments of the invention will be discussed in detail with reference to the accompanying drawings.

Figure 1:
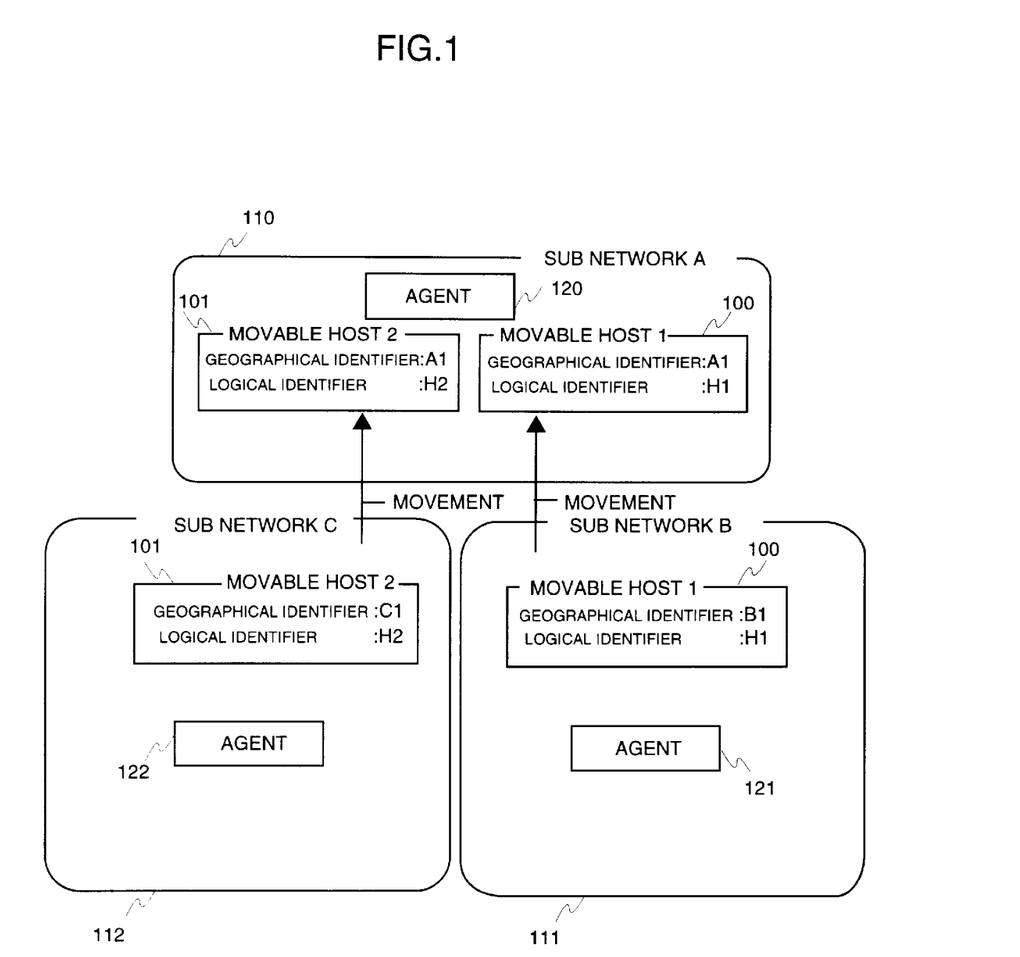
FIG. 1 is a model view showing a network model for describing an embodiment of the present invention.

At first, the description will be oriented to a method for allocating a geographical identifier according to an embodiment of the present invention with reference to FIG. 1.

As shown in FIG. 1, numerals 110 to 112 denote sub networks, Numerals 120 to 122 denote agents for the sub networks 110 to 112. Numerals 110 and 101 denote movable hosts. In the current state, the movable host 100 is connected to the sub network 111, while the movable host 101 is connected to the sub network 112. The agent 121 is the FA (Foreigh Agent) of the movable host 100. The agent 122 is the FA of the movable host 101. The movable host 100 uses (H1, B1) as the pair of a logical identifier and a geographical identifier. The movable host 101 uses (H2, C1) as the pair. Consider that the movable hosts 100 and 101 are moved from that initial state to the sub network 110 where those hosts 100 and 101 exist. The movements of the movable hosts 100 and 101 to the sub network 110 are not necessarily concurrent but are lagged behind each other.

The agent operates to periodically notify a destination address of a link layer header of a broadcasting address, a transmitting address of a link layer address of the agent, a destination address of a network layer header of a broadcasting address, a transmitting address of a beacon containing location information having the agent address used as the link layer and the network layer headers. When the movable host is moved to another sub network, the movable host receives a beacon transmitted by a different agent from the previous agent having transmitted the beacon received by the movable host before the movement. When the movable host detects the receipt of the different beacon from the previous beacon, the movable host detects the relocation to another sub network. Hence, in the movement shown in FIG. 1, when the movable host 100 is moved from the sub network 111 to the sub network 110, the movable host 100 detects the beacon from the agent 120 in place of the beacon from the agent 121 and thereby the movement from the sub network 111 to the sub network 110. Likewise, when the movable host 101 detects the beacon from the agent 120, the movable host 101 detects the movement from the sub network 111 to the sub network 110.

The movable host having detected the movement to another sub network obtains a geographical identifier in the new sub network. The obtention of the geographical identifier is implemented by transmitting the message for requesting the geographical identifier containing the logical identifier of the movable host to the agent for transmitting the beacon and receiving the message for responding to the geographical identifier containing the geographical identifier allocated by the agent.

Figure 2:
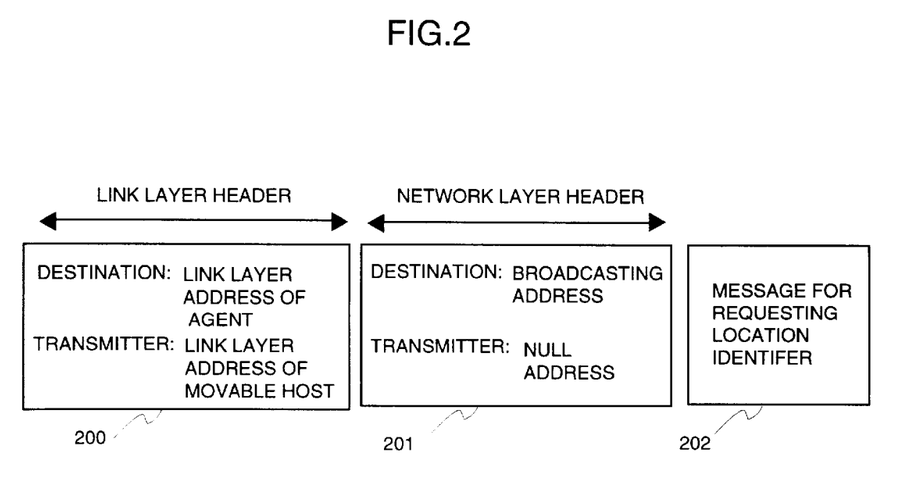
FIG. 2 is a view showing a packet format of a message for requesting a geographical identifier.
Figure 3:
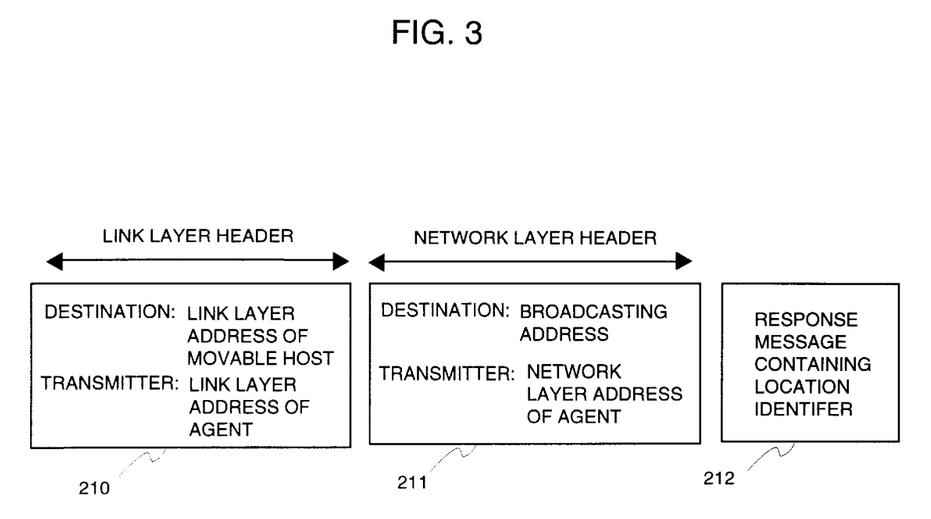
FIG. 3 is a view showing packet format of a message for responding to a geographical identifier.

The packet formats of the message for requesting a geographical identifier and the message for responding to a geographical identifier are illustrated in FIGS. 2 and 3. FIG. 2 shows the packet format of the message for requesting a geographical identifier. A numeral 200 denotes a link layer header. A numeral 201 denotes a network layer header. A numeral 202 denotes a message for requesting a geographical identifier. FIG. 3 shows a packet format of the message for responding to a geographical identifier. A numeral 210 denotes a link layer header. A numeral 211 denotes a network layer header. A numeral 212 denotes a response message containing the geographical identifier. When the movable host transmits the message for requesting a geographical identifier, the movable host does not still have the geographical identifier. Hence, the movable host uses a null address as the transmitting address of the network layer header 201 of the message for requesting a geographical identifier. The destination address of the network layer header 201 of the message for requesting a geographical identifier may use a broadcasting address as shown in FIG. 2 or use an address of an agent that is to be obtained when the movable host receives the beacon. Further, when the movable host receives the beacon from the agent, the movable host can obtain the link layer address of the agent. Hence, the movable host uses the link layer address of the agent as the destination address of the link layer header of the message for requesting a geographical identifier. On the other hand, when the agent receives the message for requesting a geographical identifier from the movable host, the agent can obtain the link layer address of the movable host. Hence, the agent may use the link layer address of the movable host as the destination address of the link layer header 210 of the message for responding to a geographical identifier. On the contrary, the agent uses the broadcasting address as the destination address of the network layer header 211, because the movable host having transmitted the message for requesting a geographical identifier does not still have a geographical identifier.

In this embodiment, in the foregoing transfer of the messages for requesting a geographical identifier and responding to a geographical identifier, the agent responds to the request for a geographical identifier issued from another movable host as a response message containing the same geographical identifier as the geographical identifier. The agent having notified the movable host of the geographical identifier is made to be the FA of the movable host and operates to store the logical identifier, the geographical identifier, and the link layer address of the movable host in a registration table.

Figure 4:
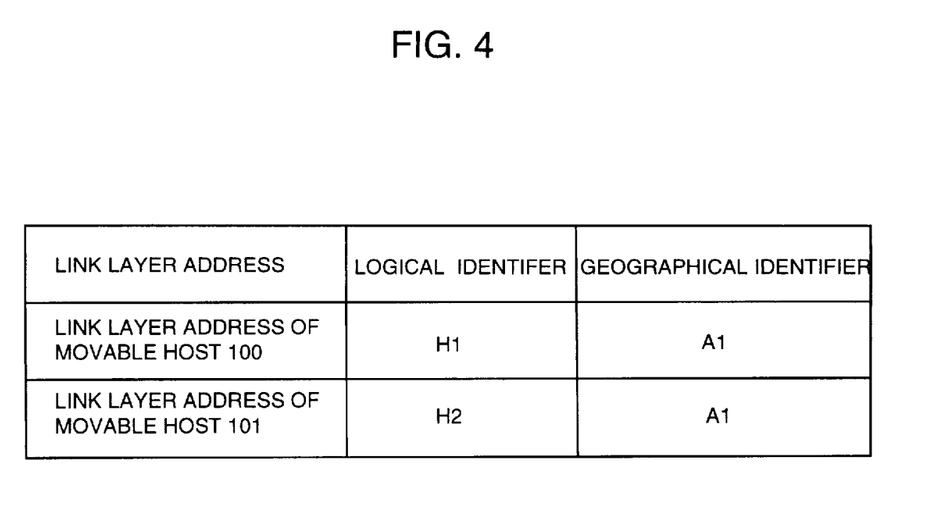
FIG. 4 is a view showing an embodiment of a registration table used by a foreign agent.

The foregoing allocation of the geographical identifier will be discussed with reference to FIG. 1. The pair of a logical identifier and a geographical identifier of the movable host 100 is (H1, A1). The pair of the movable host 101 is (H2, A1). The movable hosts 101 and 100 are located in the sub network 110. The geographical identifier uses the same A1. The agent 120 served as the FA of the movable hosts 100 and 101 includes the registration table as shown in FIG. 4.

As set forth above, the communication between the movable hosts where the same geographical identifier is allocated is executed as follows.

The format of the packet to be transmitted or received by the movable host is a packet formed by encapsulating a logical identifier header by using a geographical identifier header (see the writing 1). The packet to be transmitted to the movable host is controlled to be constantly communicated through the FA of the movable host. This control method is implemented by applying to the FA the technique known as a proxy APR (Address Resolution Protocol) (See Smoot Carl-Mitchell, John S. Quarterman, "Using ARP to Implement Transparent Subnet Gateways", Request for Comments 1027, October 1987.) The adjacent node that wants to transfer the packet to the movable host is required to obtain the geographical identifier of the movable host and the link layer address corresponding to the geographical identifier. The node that wants to transfer the packet to the movable host, therefore, operates to broadcast a message for requesting the link layer address corresponding to the geographical identifier of the movable host before transferring the packet. In applying the proxy ARP to the FA, when the FA receives the message for requesting the link layer address corresponding to the geographical identifier of the movable host, the FA operates to give back to the node that wants to transfer the packet to the movable host its own link layer address as the link layer address corresponding to the geographical identifier. This link layer address is served as a proxy of the movable host. Hence, the node that wants to transfer the packet to the movable host operates to transfer the link layer address of the FA as the link layer address corresponding to the movable host. It means that the FA receives the packet destined for the movable host. Further, when the FA receives the packet destined for the movable host registered in the registration table, the FA operates to obtain the link layer address corresponding to the destination address of the logical identifier header from the registration table, based on the destination address of the logical identifier header and add the link layer header having the link layer address as its destination to the packet. The resulting packets are transmitted. This transmission makes it possible to properly transfer the packets. On the other hand, when the movable host transmits the packets, after obtaining the geographical identifier, all packets are set to be transferred to the FA. That is, the packets are transferred through the FA.

Figure 5:
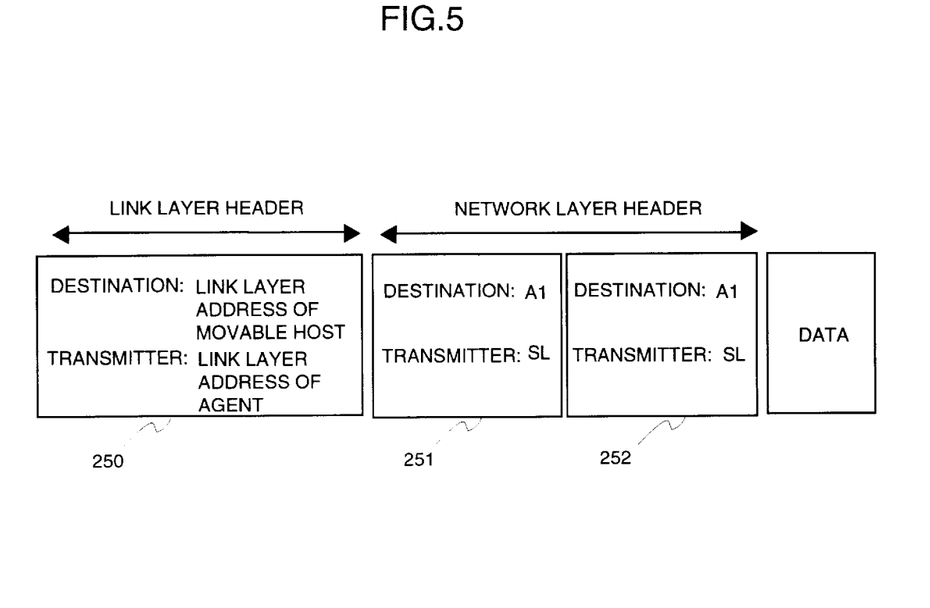
FIG. 5 is a view showing a format of a packet transferred to a movable host.

The foregoing communication executed by the movable host will be described with reference to FIG. 1. In the configuration shown in FIG. 1, when the movable host 100 and the agent 120 served as the FA of the movable host 101 receive the packet destined for the movable host 100, for example, the format of the packet to be transferred by the agent 120 is the format shown in FIG. 5 on the assumption that the pair of a logical identifier and a geographical identifier (SH, SL) of a packet transmitter. In FIG. 5, a numeral 250 denotes a link layer header. A numeral 251 denotes a header based on the geographical identifier. A numeral 252 denotes a header based on the logical identifier. The system of the agent 120 required to transfer the packets shown in FIG. 5 is shown in FIG. 6.

Figure 7:
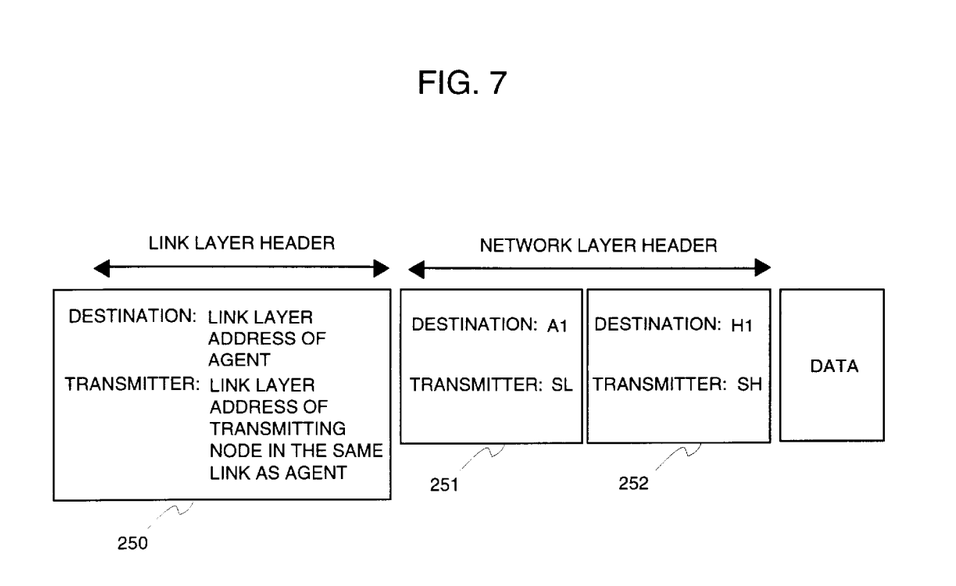
FIG. 7 is a view showing a format of a packet destined for a movable host, received by the agent.

The packet destined for the movable host 100 is transferred from a node located in the same link as the agent 120 such as a router to the agent 120 by means such as the proxy ARP. As shown in FIG. 7, the received packet has the destination link layer address served as the agent and the transmitting link layer address served as a node on the same link as the agent 120.

Figure 6:
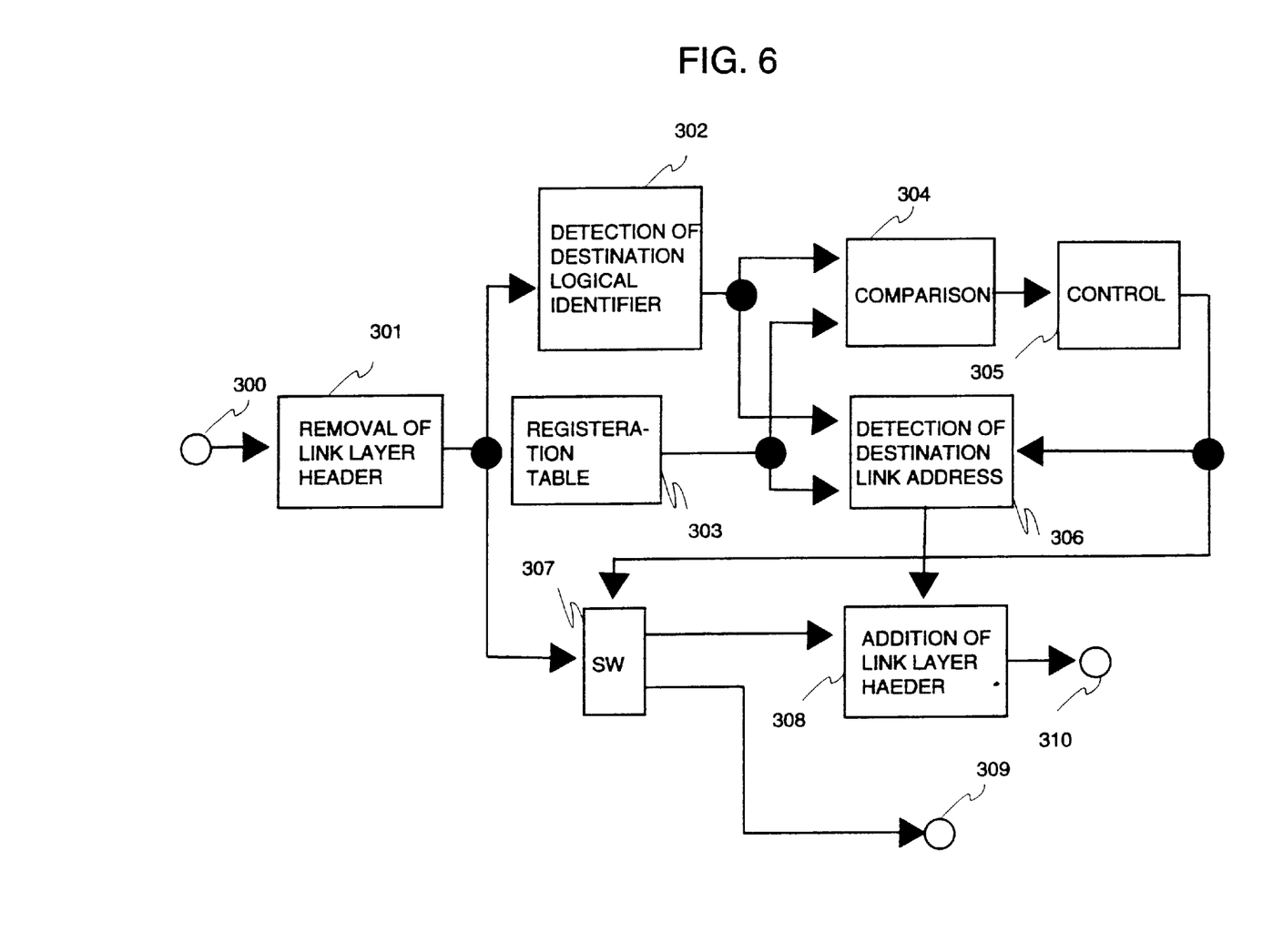
FIG. 6 is a system diagram showing an agent for transferring a packet to a registered movable host.

When the agent 120 receives the packet of the format as shown in FIG. 7, the packet is applied to an input terminal 300 shown in FIG. 6. The inputted packet is sent to a link layer header remover 301 in which the link layer header 250 is removed from the packet. The packet from which the link layer header 250 is removed is sent to a destination logical identifier detector 302 and a switch 307. The destination logical identifier detector 302 operates to detect the destination logical identifier Hi from the inputted packet and then supply it to a comparator 304 and a destination link address detector 306. The comparator 304 is also inputted with the logical identifier registered in the registration table 303 structured as shown in FIG. 5. The comparator 304 operates to detect whether or not the destination logical identifier supplied from the destination logical identifier detector 302 is registered in the registration table 303 and supply a registration detecting pulse if registered or a non-registration detecting pulse if not registered to a control unit 305. When the registration detecting pulse is applied from the comparator 404 to the control unit 305, the control unit 305 operates to supply the control pulse for indicating the registration to the switch 307 and the destination link address detector 306. If the control unit 305 is inputted with the non-registration detecting pulse, the control unit 305 operates to output the control pulse for indicating the non-registration to the destination link address detector 306 and the switch 307.

Where the control pulse inputted from the control unit 305 indicates the registration, the destination link address detector 306 operates to detect and output the link layer address of the host identified by the destination logical identifier, based on the destination logical identifier and the registered content of the registration table 303 inputted from the destination logical identifier detector 302. Where the control pulse inputted from the control unit 305 indicates the non-registration, the detector 306 does not do any operation.

On the other hand, where the control pulse from the control unit 305 indicates the registration, the switch 307 operates to supply to the link layer header adder 309 the received packet from which the link layer header is removed, supplied from the link layer header remover 301. Where the control pulse from the control unit 305 indicates the non-registration, the switch 307 operates to output to an output terminal 309 for doing another process the received packet from which the link layer header is removed, supplied from the link layer header remover 301.

As set forth above, if the received packet is destined for the registered movable host, the link layer header adder 308 is inputted with the received packet from which the link layer header is removed from the link layer header remover 301 and the link layer address of the destination movable host from the destination link address detector 306. The link layer header adder 308 operates to create the link layer header 250 destined for the movable host as shown in FIG. 5 by using the link layer address of the movable host and the link layer address of its own agent supplied from the destination link address detector 306. Then, the created link layer header 250 is added to the packet inputted from the switch 307. The resulting packet is outputted to the output terminal 310 and then is transferred to the movable host. The foregoing process makes it possible for the agent to properly transfer the packets to the destination movable host if the movable hosts have the same geographical identifier.

On the other hand, when the movable hosts 100 and 101 obtain the geographical identifiers, the movable hosts 100 and 101 are set to transmit all packets to the agent 120. All packets transmitted from the movable hosts 100 and 101 are transferred to the agent served as the FA of the movable hosts 100 and 101. When the agent 120 receives the packets from the movable hosts 100 and 101, the agent 120 operates to properly transfer those packet to the destination.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for allocating a geographical identifier, implemented in a network, the method comprising the steps of:

providing a plurality of sub networks with one another;

maintaining a plurality of movable hosts each having a geographical identifier depending on the currently connected sub network and a logical identifier independent of the currently connected sub network and allowing said movable hosts to be moved among said sub networks while keeping communication therebetween, each of said movable hosts serving to conduct communications of packets, each having a header based on said geographical identifier and another header based on said logical identifier;

providing a node for supporting communication with said movable host in each of said sub networks, such that said node of each of said sub networks executes the steps of:

allocating a same geographical identifier to the plurality of movable hosts connected in one of said sub networks and storing the logical identifiers and data link layer addresses of said plurality of movable hosts in a registration table;

detecting a destination logical identifier of a packet if any packet is received and if said received packet is destined for the movable host to which said same geographical identifier is allocated by using said detected destination logical identifier and said registration table;

generating a data link layer header by using a data link layer address of the movable host identified by said destination logical identifier in said registration table; and adding said generated data link layer header to said received packet before transferring said packet;

wherein the packets transmitted to a movable host are controlled to be transmitted through a node of a sub network having said movable host connected therewith based on a Proxy Address Resolution Protocol.

2. A method for allocating a geographical identifier, implemented in a network and including the steps of:

connecting a plurality of sub networks with one another;

maintaining a plurality of movable hosts each having a geographical identifier depending on the currently connected sub network and a logical identifier independent of the currently connected sub network and allowing the movable hosts to be moved among said sub networks while keeping communication therebetween, each of said movable hosts serving to conduct communications of packets, each having a header based on said geographical identifier and another header based on said logical identifier;

providing a node for supporting communication with said movable host in each of said sub networks, said node of each of said sub networks executing the steps of keeping the same geographical identifiers of network layers of the plurality of movable hosts connected to said sub network and storing in a registration table the same geographical identifier and the logical identifier of said network layer of each of said movable hosts in linkage with a data link layer address of said movable host;

detecting a destination logical identifier from a received packet;

detecting if said received packet is destined for the movable host to which the same geographical identifier is allocated by using said detected destination logical identifier and said registration table;

retrieving said data link layer address of each of said movable hosts specified by said destination logical identifier from said registration table if said received packet is destined for said movable host to which said same geographical identifier is allocated;

generating a data link layer header based on said retrieved data link layer address; and adding said generated data link layer header to said received packet and transferring said packet;

wherein said node executes a further step of transferring said received packet to the node specified by the same geographical identifier of said received packet, and based on a Proxy Address Resolution Protocol.

* * * * *

UNITED STATES PATENT AND TRADEMARK OFFICE
CERTIFICATE OF CORRECTION

PATENT NO. : 6,122,268
DATED : September 19, 2000
INVENTOR(S) : K. Okanoue et al.

It is certified that error appears in the above-identified patent and that said Letters Patent is hereby corrected as shown below:

Title Page,
Item [56], References Cited, OTHER PUBLICATIONS, insert:

-- Okanoue, Osawa, Gotoh, and Komatsu, "IP Mobility with Double IP Header", Proceedings of Institute of Electronics Information and Communication Engineers, IN95-64, Vol. 95, No. 269, September 1995.
    Smoot Carl-Mitchell, John S. Quarterman, "Using ARP to Implement Transparent Subnet Gateways", Request for Comments 10278, October 1987. --

Signed and Sealed this

Fifteenth Day of January, 2002

*Attest:*

JAMES E. ROGAN
*Director of the United States Patent and Trademark Office*

*Attesting Officer*